April 18, 1933.　　　W. H. HAUPT　　　1,904,454
DISPENSER OF THE TWIN CHAMBER TYPE
Filed April 2, 1931　　　2 Sheets-Sheet 1

April 18, 1933.  W. H. HAUPT  1,904,454
DISPENSER OF THE TWIN CHAMBER TYPE
Filed April 2, 1931  2 Sheets-Sheet 2

INVENTOR
Walter H. Haupt
BY
ATTORNEY

Patented Apr. 18, 1933

1,904,454

UNITED STATES PATENT OFFICE

WALTER H. HAUPT, OF LUDLOW, KENTUCKY, ASSIGNOR TO AUGUSTINE DAVIS, JR., OF CINCINNATI, OHIO

DISPENSER OF THE TWIN CHAMBER TYPE

Application filed April 2, 1931. Serial No. 527,155.

The invention relates to the type of dispenser for gasolene and other liquids having twin measuring chambers provided with automatic valve mechanism the condition of which reverses at intervals as long as liquid is pumped to the measuring chambers, so that while each chamber in turn is discharging its contents the other chamber is being filled.

In delivering gasolene from such dispensers into the tanks of certain makes of cars difficulty has been encountered with splashing or foaming of the liquid out of the fill-opening of the tank into which the nozzle at the end of the dispenser hose is inserted. Needless to say this creates a dangerous condition which it is important to avoid. I have ascertained that the trouble is due to air gaps which exist between the successive measured quantities as they are discharged from the measuring chambers one after another into the discharge conduit. These bodies of air, whether they continue as air gaps between slugs of the liquid, or whether they mix with the gasolene in the progress through the discharge conduit and the hose, as they do to a greater or less extent, result in more or less foaming in the automobile tank and in an impulsive action as the bodies of air, or what remains of them, are released at the nozzle mouth.

The reason for the existence of air spaces between the measured quantities is peculiar to this type of dispenser, since, in order to prevent overlapping, it is necessary in some way to insure that each measuring chamber shall empty completely before the valve mechanism reverses and permits the other chamber to start emptying. By "overlapping" is meant a condition of premature reversal of the valve mechanism, with the result that some portion of a gallon or other measured quantity to which the customer is entitled still remains in the last discharging chamber and is cut off from the outlet of the dispenser by such reversal.

In twin chamber dispensers of the kind in which the reversals of the valve mechanism are brought about or initiated by pressure developing on the liquid in each chamber when such chamber is filled and its vent has been closed by a float valve or otherwise, it has been proposed heretofore to apply air pressure to the tops of the measuring chambers, in order to hasten the emptying of one chamber and in some measure to retard the filling of the other. It has also been customary to provide a restriction or other means in the supply conduit to keep the liquid from being pumped too fast to each chamber as it is being filled.

In the prior application of Paul S. Shield and myself, filed January 10, 1930, Serial No. 419,802, and in my copending application Serial No. 517,444, filed February 21, 1931, are disclosed forms of an automatic lock which prevents reversal of the valve mechanism until after each chamber is entirely emptied. In the particular form illustrated in the Haupt and Shield application, the lock in question was controlled by the presence or absence of liquid at a point in the discharge conduit, through a float which operated a valve, which in turn controlled a pneumatic device, which controlled the lock, this pneumatic device being supplied with compressed air from the system that supplied air under pressure to the tops of the measuring chambers for the purpose of hastening the emptying. In my own more recent application I have shown a construction in which the float chamber for the float, constituting the primary control element for the reversal lock, is moved from the outer part of the discharge conduit, adjacent the inlet end of the hose, as shown in the Haupt and Shield application, to the receiving end of said conduit. This made possible a sufficiently fast rate of delivery without the use of air pressure, and it may be remarked that instead of air for the relay system controlling the reversal lock, I used liquid under pressure of the gasolene pump.

The change in location of the float chamber greatly shortened the air space separating each quantity leaving a measuring chamber from the preceding quantity that issued from the other chamber, and this fact and the other fact that each of these spaces was no longer supplied from a pressure source, resulted in some improvement in respect to the amount of foaming or splashing that might occur in the filling of a customer's tank. With some tanks, however, and more especially those having perforated metal screens under the fill-opening, the difficulty was not to be overcome in this way, and I therefore made a new provision which is the subject of this application.

Briefly, the object of the present invention or improvement is to vent the air bodies from the discharge conduit while they still exist as gaps between the liquid quantities and before they have become seriously mixed with the gasolene, and to accomplish this in such a way that the measured liquid is not diverted. A further object is to lead all vapor-carrying air, vented in this manner, to the underground tank with which the dispenser is connected, or to some other enclosure or conduit connected with the supply system of the dispenser, so that they will not constitute a hazard.

In the concrete embodiment, the provision comprises an air-pocket on top of the discharge conduit and in open communication therewith, an air outlet from the top of this pocket, a pipe leading from this pocket downward to the underground tank or drain-back system of the dispenser, and a float-valve in the pocket adapted to evacuate the air bodies in order that the measured liquid quantities may close up, while preventing escape of the liquid.

In the accompanying drawings, forming part hereof:

Fig. 1 is a view partly in vertical section and partly in elevation of a dispenser with the invention applied thereto. The view is somewhat schematic, since it is unnecessary to show a dispenser complete in all its details; and certain parts are broken out or broken away. The reversing valve actuating device has been shown for clearness projected over to one side of the view, the dot and dash lines indicating that the shafts of this device are in reality continuations of the shafts shown in the main part of the view.

Figure 1:
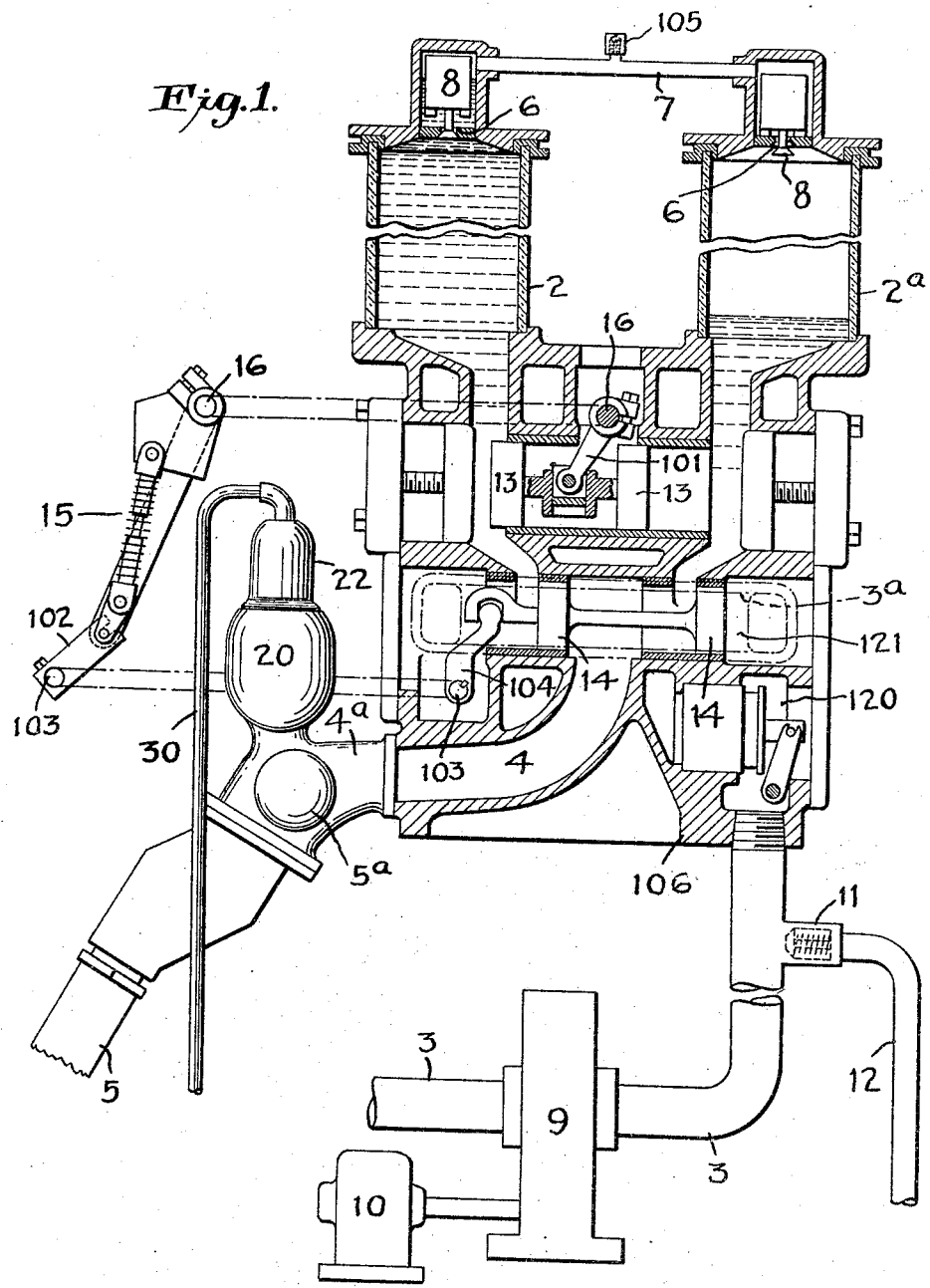
Figure 2:
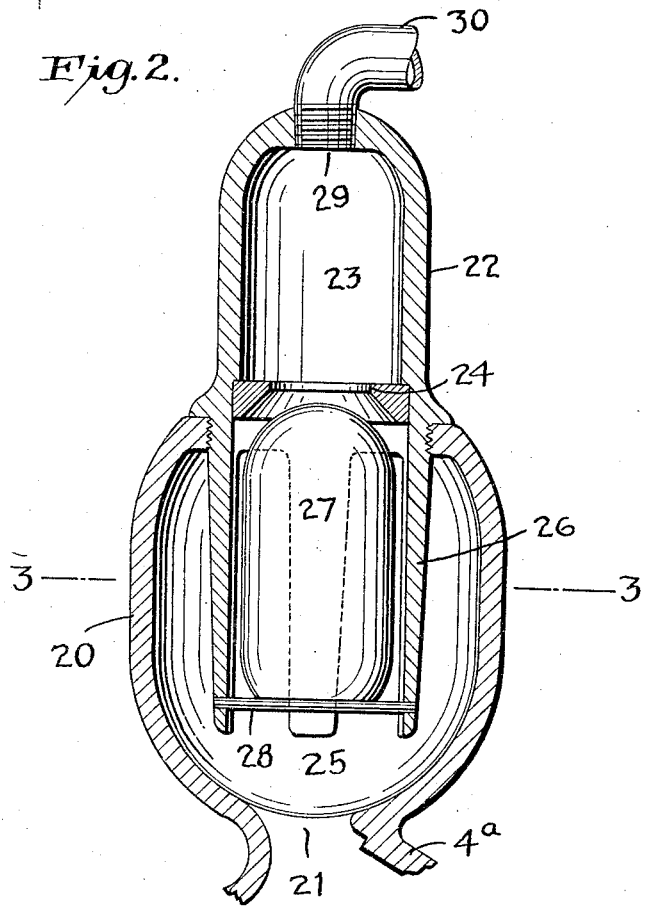
Fig. 2 is a vertical section on a larger scale through the air pocket, the float valve in the pocket and a portion of the air pipe connected with the top of the pocket being in elevation.
Figure 3:
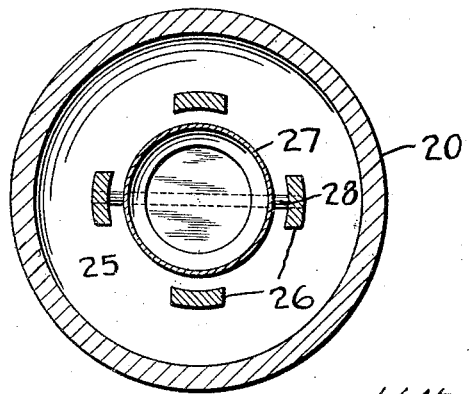
Fig. 3 is a cross-section on the line 3—3 of Fig. 2.

The particular form of dispenser will be described without attempting to describe all the modifications to which the invention is applicable.

The twin measuring chambers are marked 2 and 2ª. 3 is a supply passage and 4 is a discharge passage, to the end of which latter the hose 5 is connected. A bull's eye or sight glass 5ª is preferably placed in the wall of the outer portion of the discharge passage so that the unit quantities of liquid can be seen passing from the dispenser.

The chambers preferably have vent openings 6 at the top, these vent openings being interconnected by a pipe 7 and being closed alternately, when each chamber is completely filled, by float valves 8. Connected with the pipe 7 is an inwardly opening, spring-closed air-admission valve 105.

The supply passage 3 is connected with a storage tank (not shown) and contains a pump 9 which is driven by a motor 10. A relief valve 11 is preferably placed in the supply line to divert liquid into a return line 12 and thereby limit the pressure that can be placed on the liquid going to the chambers and the reversing mechanism. The supply passage 3 is connected with a master valve chamber 120 in the casting 166 of the dispenser. This valve chamber communicates through an opening, which it is not necessary to illustrate, with a continuation passage 3ª in the casting; the ends of this passage opening into the opposite ends of a slide valve chamber 121. The passage 3ª is indicated only in broken lines since it does not lie in the plane of section.

The reversing mechanism illustrated is of the type comprising a piston 13 exposed to the liquid pressure developed in the measuring chambers, a four-way slide valve 14 in the chamber 121 and a spring-toggle valve-actuating device 15. The valve connects each measuring chamber alternately with the supply and discharge passages, one chamber being connected with the supply while the other is connected with the discharge, and vice-versa. When either chamber is empty and the other is filled with liquid, the pressure developed on this liquid by reason of the corresponding vent 6 being closed acts on the piston 13, moving the latter to the right or to the left depending upon its last position. This movement stores up power in the snap-over action device 15, and after the latter is moved past center its spring acts to reverse the position of the valve. This operation is repeated automatically while liquid continues to be supplied to the measuring chambers.

The valve actuating device 15 need not be described in detail since any suitable or known device of this character may be employed. Suffice it to say that it is connected with a rock-shaft 16 which is connected by an arm 101 with the piston and that it is also connected by an arm 102 with another rock-shaft 103, which has another arm 104 connected with the valve.

For an illustration of a mechanism including an automatic lock preventing premature reversal of the valve 14, reference may be had to my copending application Serial No. 517,444.

The measured quantities are discharged from the chambers 2, 2ª and the tributary spaces forming part thereof, into the conduit 4 and thence pass to and through the hose 5. Because of the necessity for preventing overlapping, air gaps exist between the liquid quantities, and, as already stated, it is the purpose to eliminate these air bodies promptly.

The outer portions 4ª of the rigid discharge conduit is made with an air-pocket 20 projecting from its top. There is an ample entrance 21 into the bottom of this air-pocket from the top of the discharge conduit. A separate piece 22 is preferably screwed into the air-pocket from the top, this piece forming an upper chamber 23 and containing a wide-mouth valve seat 24 between said upper chamber and the lower chamber 25 of the air-pocket. The portion of the piece 22 which extends downward into the lower chamber of the air-pocket forms a cage 26 for a float 27, the upper end of which is shaped to close tightly against the seat 24 when the float is lifted by liquid. In the absence of liquid, the float is sustained in its dropped position by a cross-pin 28.

The air-pocket is closed except for the entrance 21 at the bottom and an air exit 29 at the top, and to the latter a pipe 30 is connected. This pipe turns downward and is connected with the underground storage tank, or with the drainback system of the dispenser.

When each separating air body reaches the entrance 21 to the air-pocket, the air is expelled into the chamber 25, past the float valve 27, and through the exit and pipe 30. When sufficient following liquid enters the chamber 25, it raises the float, which closes the opening through the seat 24. Any small amount of liquid which may find its way into the upper chamber 23 can not leave the pocket, but will return to the discharge conduit as soon as the float 27 drops.

These operations are repeated as each air gap in the procession of liquid quantities reaches the venting point, with the result that the liquid is delivered from the hose nozzle as a substantially continuous stream, or at least without those disturbances which have given trouble in the filling of automobile tanks.

I claim:

1. In a dispenser of the type having twin measuring chambers and automatic reversing mechanism causing each chamber to empty in turn while the other is being filled, a discharge conduit into which the measured quantities are emptied, an air-pocket in free communication with said conduit, an air exit from said pocket, and valve means in position to evacuate the air bodies through the air-pocket while liquid is flowing through the discharge conduit, said valve means being operated by a rise in the liquid level in the air-pocket to prevent egress of the liquid through said air exit.

2. In a dispenser of the type having twin measuring chambers and automatic reversing mechanism causing each chamber to empty in turn while the other is being filled, a discharge conduit into which the measured quantities are emptied, an air-pocket in free communication with said conduit, said pocket having upper and lower chambers and an intervening wide-mouth seat, the upper chamber having an air exit, and a float valve cooperative with said seat.

3. In a dispenser of the type having twin measuring chambers and automatic reversing mechanism causing each chamber to empty in turn while the other is being filled, a discharge conduit into which the measured quantities are emptied, an air-pocket in free communication with said conduit, said pocket having upper and lower chambers and an intervening wide-mouth seat, the upper chamber having an air exit, a cage extending into the lower chamber, and a float in said cage to close upward against said seat.

4. In a dispenser of the type having twin measuring chambers and automatic reversing mechanism causing each chamber to empty in turn while the other is being filled, a discharge conduit into which the measured quantities are emptied, an air-pocket in free communication with said conduit, an air exit from said pocket, a pipe extending from said exit and extending downward to conduct vapor-laden air back to the supply system of the dispenser, and a valve in position to evacuate the air bodies through the air-pocket while liquid is passing through the discharge conduit, and to prevent egress of the liquid through the air-pocket.

WALTER H. HAUPT.